(12) United States Patent
Zhou

(10) Patent No.: US 9,052,544 B2
(45) Date of Patent: Jun. 9, 2015

(54) DIRECT-LIGHT BACKLIGHT MODULE AND LIQUID CRYSTAL DISPLAY DEVICE

(75) Inventor: Gege Zhou, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 149 days.

(21) Appl. No.: 13/512,692

(22) PCT Filed: Apr. 12, 2012

(86) PCT No.: PCT/CN2012/073922
§ 371 (c)(1),
(2), (4) Date: May 30, 2012

(87) PCT Pub. No.: WO2013/143176
PCT Pub. Date: Oct. 3, 2013

(65) Prior Publication Data
US 2013/0250212 A1 Sep. 26, 2013

(30) Foreign Application Priority Data
Mar. 26, 2012 (CN) .......................... 2012 1 0082670

(51) Int. Cl.
*G02F 1/1335* (2006.01)
(52) U.S. Cl.
CPC .... *G02F 1/133606* (2013.01); *G02F 1/133602* (2013.01); *G02F 1/133604* (2013.01); *G02F 1/133611* (2013.01)

(58) Field of Classification Search
USPC ............ 349/64, 61, 62, 65, 112, 95; 362/606, 362/615, 616, 617
See application file for complete search history.

(56) References Cited

U.S. PATENT DOCUMENTS

| 7,549,760 | B2 * | 6/2009 | Jung et al. .................... 362/97.1 |
| 8,210,731 | B2 * | 7/2012 | Iwasaki ......................... 362/615 |
| 2007/0296888 | A1 * | 12/2007 | Kim et al. ........................ 349/65 |
| 2010/0208161 | A1 * | 8/2010 | Sasaki et al. .................... 349/58 |

* cited by examiner

*Primary Examiner* — Edward Glick
*Assistant Examiner* — Mark Teets
(74) *Attorney, Agent, or Firm* — Andrew C. Cheng

(57) ABSTRACT

The present invention provides a direct-light backlight module and a liquid crystal display device. The direct-light backlight module includes at least two light sources; a diffuser place, disposed above the light sources; a reflection plate, disposed beneath the light sources; and an optical film, disposed on top of diffuser plate, further including a plurality of via holes disposed at corresponding areas on the optical film between two neighboring light sources; and further including a liquid crystal panel, disposed on top of the optical film. Through this manner, the present invention can realize the thin design of liquid crystal display device, with the luminance uniformity of backlight module.

18 Claims, 4 Drawing Sheets

DIRECT-LIGHT BACKLIGHT MODULE AND LIQUID CRYSTAL DISPLAY DEVICE

BACKGROUND OF THE INVENTION

1. Field of the Invention

The present invention relates to the field of liquid crystal displaying techniques, and in particular to a direct-light backlight module and liquid crystal display device.

2. The Related Arts

Recently, the flat panel TV techniques undergo fast development and have replaced the conventional Cathode Ray Tube (CRT) TV. The liquid crystal display TV is a flat panel TV.

Because the liquid crystal panel cannot emit light, the liquid crystal display requires a backlight module to provide lighting to realize the image displaying on liquid crystal panel. The known backlight module techniques can be divided into the direct-light type and the edge-light type according to the location of the light source. FIG. 1 shows a schematic view of an embodiment of a current direct-light backlight module. As shown in FIG. 1, a direct-light backlight module includes an optical film 101, a diffuser plate 102 and a light source 103. Optical film 101 of FIG. 1 consists of three layers of films, and is disposed on top of diffuser plate 102. Diffuser plate 102 is disposed above light source 103, and located at a light mixing distance D from light source 103.

Wherein the light mixing distance D between light source 103 and diffuser plate 102 must be sufficiently long to ensure the luminance uniformity of the backlight when viewing from above optical film 101. However, this direct-light backlight module will be thicker, which is a disadvantage to the thin design of liquid crystal display. On the other hand, when mixing light distance D is reduced, the thickness of direct-light backlight module is also reduced. But, the reduction in mixing light distance will lead to the non-uniformity of luminance of the backlight module. As shown in FIG. 2, the above areas corresponding to light source 203 will be brighter, while the areas between the corresponding areas will be darker and lead to non-uniformity of luminance. The reason why the areas between the corresponding areas will be darker is that the amount of light reaching the areas is less, which is then absorbed by optical film 201 when passing through; therefore, the light emitting from those areas will be even less, thus showing darker areas.

The known solution to solve the above non-uniformity problem is to increase the number of light bars, but the cost will also be increased.

SUMMARY OF THE INVENTION

The technical issue to be addressed by the present invention is to provide a direct-light backlight module and a liquid crystal display device, which can realize both the luminance uniformity of backlight module and thin design of liquid crystal display device.

The present invention provides a direct-light backlight module, which comprises at least two light source; a diffuser plate, disposed above the light sources; a reflection plate, disposed beneath the light sources; an optical film, disposed on top of the diffuser plate, and disposed with a plurality of via holes between locations corresponding two neighboring light sources. The plurality of via holes is uniformly distributed and the diameter of the via hole increases as the distance to light source increases. Alternatively, both the diameters and the distribution density of the via holes increase as the distance to light source increases. Wherein, the optical film includes a diffuser film and two prism lenses, with diffuser film disposed between two prism lenses and diffuser plate, or two prism lenses disposed between diffuser film and diffuser plate.

According to a preferred embodiment of the present invention, via holes are disposed on diffuser film or prism lenses, or both diffuser film and prism lenses.

According to a preferred embodiment of the present invention, prism lenses are made of PET material, and diffuser film is made of PET or PC material.

According to a preferred embodiment of the present invention, the cross-section of the prism lens surface consists of a plurality of connected zigzag shapes or a plurality of connected semicircles.

According to a preferred embodiment of the present invention, the light sources are LED light bars.

The present invention provides a direct-light backlight module, which comprises: at least two light source; a diffuser plate, disposed above the light sources; a reflection plate, disposed beneath the light sources; an optical film, disposed on top of the diffuser plate, and disposed with a plurality of via holes between locations corresponding two neighboring light sources.

According to a preferred embodiment of the present invention, the plurality of via holes is uniformly distributed and the diameter of the via hole increases as the distance to light source increases.

According to a preferred embodiment of the present invention, the diameters of via holes are the same, but the distribution density of via holes increases as the distance to light source increases.

According to a preferred embodiment of the present invention, the optical film includes a diffuser film and two prism lenses, with diffuser film disposed between two prism lenses and diffuser plate, or two prism lenses disposed between diffuser film and diffuser plate.

According to a preferred embodiment of the present invention, via holes are disposed on diffuser film or prism lenses, or both diffuser film and prism lenses.

According to a preferred embodiment of the present invention, prism lenses are made of PET material, and diffuser film is made of PET or PC material.

According to a preferred embodiment of the present invention, the cross-section of the prism lens surface consists of a plurality of connected zigzag shapes or a plurality of connected semicircles.

According to a preferred embodiment of the present invention, the light sources are LED light bars.

The present invention provides a liquid crystal display device, which comprises: at least two light source; a diffuser plate, disposed above the light sources; a reflection plate, disposed beneath the light sources; an optical film, disposed on top of the diffuser plate, and disposed with a plurality of via holes between locations corresponding two neighboring light sources; and a liquid crystal panel, disposed on top of optical film.

According to a preferred embodiment of the present invention, the plurality of via holes is uniformly distributed and the diameter of the via hole increases as the distance to light source increases, or the diameters of via holes are the same, but the distribution density of via holes increases as the distance to light source increases.

According to a preferred embodiment of the present invention, the optical film includes a diffuser film and two prism lenses, with diffuser film disposed between two prism lenses and diffuser plate, or two prism lenses disposed between diffuser film and diffuser plate.

According to a preferred embodiment of the present invention, via holes are disposed on diffuser film or prism lenses, or both diffuser film and prism lenses.

According to a preferred embodiment of the present invention, prism lenses are made of PET material, and diffuser film is made of PET or PC material.

According to a preferred embodiment of the present invention, the cross-section of the prism lens surface consists of a plurality of connected zigzag shapes or a plurality of connected semicircles.

According to a preferred embodiment of the present invention, the light sources are LED light bars.

The efficacy of the present invention is that to be distinguished from the state of the art. The present invention includes a plurality of via holes disposed at correspond areas on the optical film between two neighboring light sources. Through via holes on optical film, the amount of light passing through the corresponding areas on the optical film between two neighboring light sources increases so that the luminance at those areas approximates or the same as the luminance to the areas corresponding to above of light sources. In this manner, the present invention can realize both the luminance uniformity of backlight module and thin design of liquid crystal display device.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
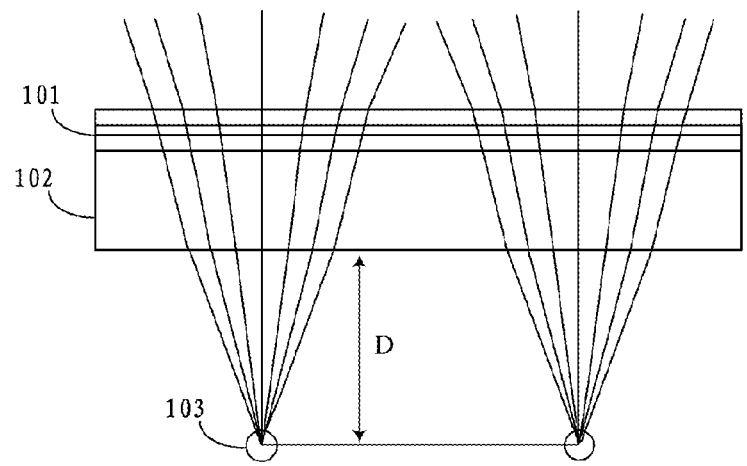
FIG. 1 is a schematic view showing the structure of a known direct-light backlight module.
Figure 2:
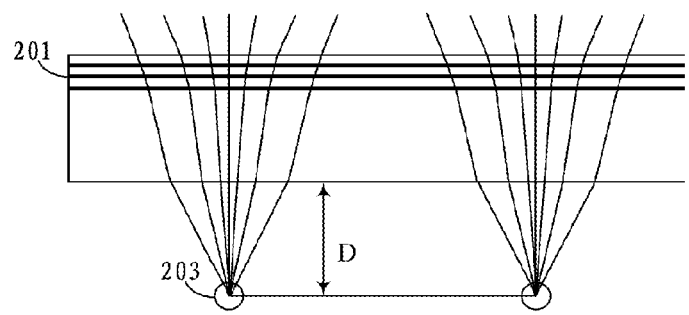
FIG. 2 is a schematic view showing the structure of another known direct-light backlight module.
Figure 3:
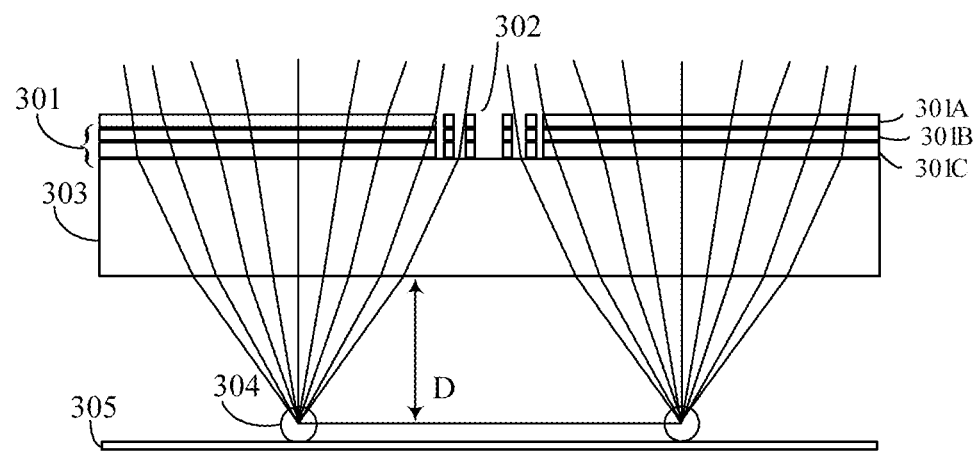
FIG. 3 is a schematic view showing the structure of an embodiment of a direct-light backlight module according to the present invention.

Referring to FIG. 3, FIG. 3 is a schematic view showing the structure of an embodiment of a direct-light backlight module according to the present invention. As shown in FIG. 3, the direct-light backlight module includes an optical film 301, diffuser plate 303, light sources 304 and a reflection plate 305, where the number of light sources is at least two. Optical film 301 further includes a diffuser film 301A and two prism lenses 301B, 301C.

In the present embodiment, reflection 305 is disposed beneath light sources 304. Diffuser plate 303 is disposed above light sources 304 at a mixing light distance D light sources 304. Optical film 301 is disposed on top of diffuser plate 303.

Reflection plate 305 is for reflecting light emitted from light sources 304 to diffuser plate 303, which diffuses light uniformly and emits the diffused light to optical film 301. Optical film 301 performs light direction correction and focus on the light to improve the front luminance.

To make the light emitted from light sources 304 to stay uniform luminance and high efficiency to emit from the backlight module, the present invention includes a plurality of via holes 302 disposed at the corresponding areas on optical film 301 between two neighboring light sources 304. The plurality of via holes 302 is disposed on diffuser film 301A, or on prism lenses 301B, 301C, or on both diffuser film 301A and prism lenses 301B, 301C.

In the present embodiment, light sources 304 are LED light bars or any other lighting devices. Diffuser film 301A is made of PET or PC material, and prism lenses 301B, 301C are made of PET material. In addition, cross-section of the surfaces of prism lenses 301B, 301C consists of a plurality of connected zigzag shapes or a plurality of connected semicircles. Diffuser film 301A can be disposed between two prism lenses 301B, 301C and diffuser plate 303, or two prism lenses 301B, 301C can be disposed between diffuser film 301A and diffuser plate 303.

Figure 4:
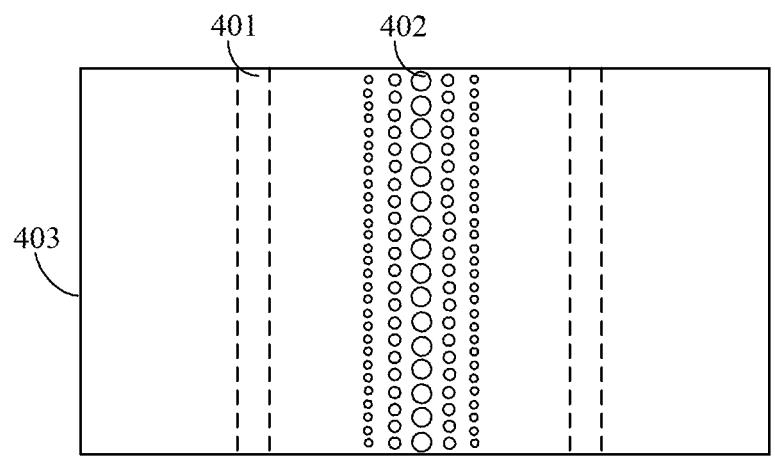
FIG. 4 is a schematic view showing the via hole distribution on optical film of an embodiment of a direct-light backlight module according to the present invention.

Referring to FIG. 4, FIG. 4 shows the distribution of via holes 402 on optical film 403. As shown in FIG. 4, a plurality of via holes 403 is disposed at the corresponding areas on optical film 403 between two neighboring light sources 401. The plurality of via holes 402 is uniformly distributed and the diameter of via hole 402 increases as the distance to light sources 401 increases. Alternatively, the diameters of via holes 402 can stay the same, but the distribution density of via holes 402 increase as the distance to light source 401 increases (not shown). Another alternative is that both diameters of via holes 402 and the distribution density of via holes 402 increase as the distance to light source 401 increases (not shown). As long as the light emitted from light sources 401 can keep uniform luminance and high efficiency to emit from the backlight module, the diameters and distribution density can be varied.

Figure 5:
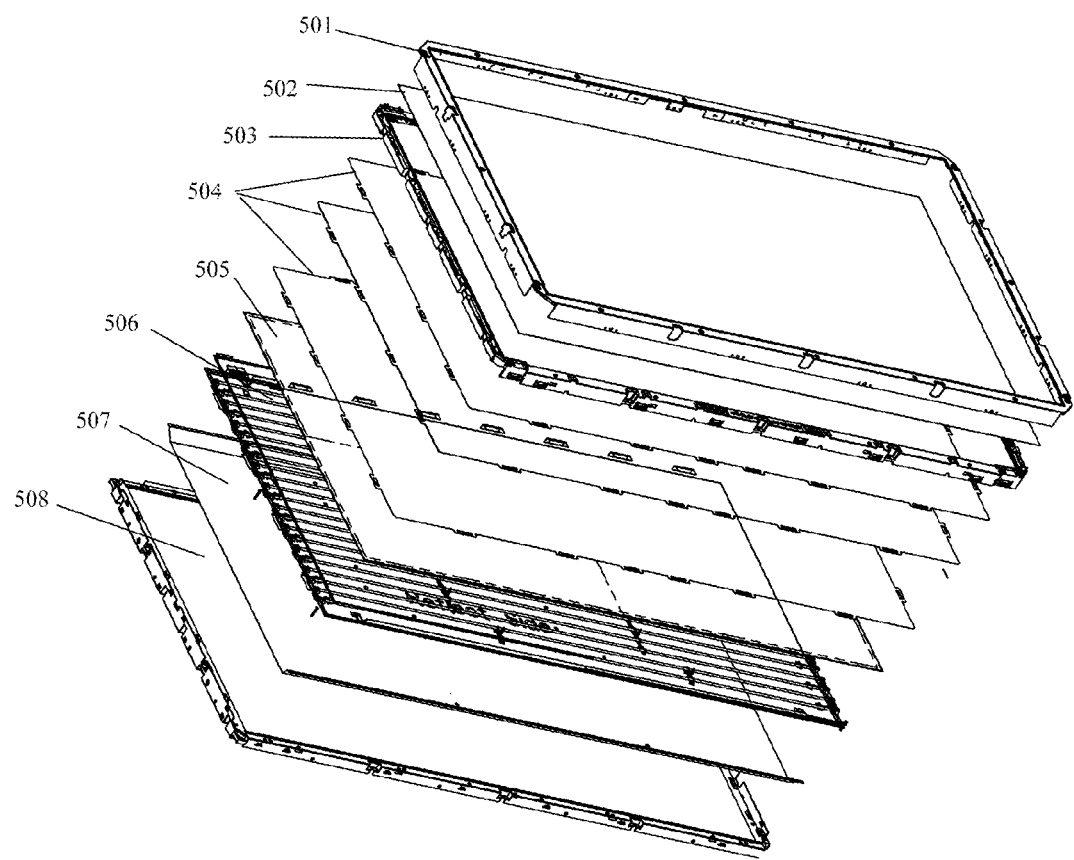
FIG. 5 is a schematic view showing the distribution of an embodiment of a liquid crystal display device according to the present invention.

Referring to FIG. 5, FIG. 5 is a schematic view showing the distribution of an embodiment of a liquid crystal display device according to the present invention. The liquid crystal display device of the present invention includes a front frame 501, a liquid crystal panel 502, a glue frame 503, an optical film 504, a diffuser plate 505, light sources 506, a reflection plate 507 and a back panel 508.

In the present embodiment, front frame 501 is disposed on top of liquid crystal panel 502 to protect liquid crystal panel 502. Optical film 504 is disposed on top of diffuser plate 505, for performing light direction correction and focus on the light from diffuser plate 505 to improve the front luminance. Diffuser plate 505 is disposed above light sources 506, for diffusing light emitted from light sources 506 uniformly. Light sources 506 are disposed above reflection plate 507. Reflection plate 507 is for reflecting light emitted downward from light sources 506 to diffuser plate 505. Back panel 508 is disposed at the bottom of the liquid crystal display device. Glue frame 503 provides protection to the liquid crystal display device, and is disposed as a rectangular column structure. The inner cavity of the rectangular column structure of the glue frame 503 to accommodate all the aforementioned elements of the liquid crystal display device.

According to the present embodiment, glue frame 503 can be any structure with a certain volume capacity, and no specific restriction is imposed by the present invention.

According to the present embodiment, optical film 504 further includes a diffuser film and two prism lenses (not shown). The diffuser film can be disposed between two prism lenses and diffuser plate 505, or two prism lenses can be disposed between the diffuser film and diffuser plate 505, wherein the diffuser film is made of PET or PC material, prism lenses are made of PET material, and cross-section of the surfaces of prism lenses consists of a plurality of connected zigzag shapes or a plurality of connected semicircles.

Figure 6:
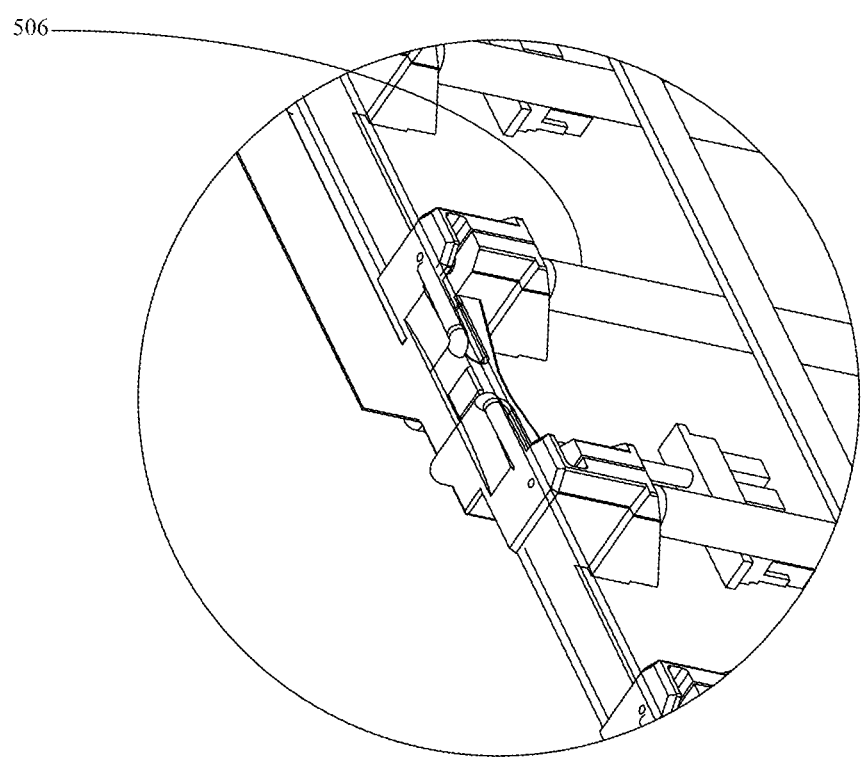
FIG. 6 is an enlarged schematic view of the light sources in an embodiment of liquid crystal display device of FIG. 5.

To make the light emitted from light sources 506 to stay uniform luminance and high efficiency to emit from optical film 504 to reach liquid crystal panel 502, the present invention includes a plurality of via holes (not shown) disposed at the corresponding areas on optical film 504 between two neighboring light sources 506. As shown in FIG. 6, FIG. 6 shows an enlarged view of light sources in FIG. 5. Light sources 506 are shaped as bar, with number more than one, and arranged an in uniform layout. A plurality of via holes (not shown) is disposed at the corresponding areas on optical film 504 between two neighboring light sources 506, wherein via holes can be disposed on diffuser film or prism lenses, or both diffuser film and prism lenses. The plurality of via holes is uniformly distributed and the diameter of via hole increases as the distance to light sources increases. Alternatively, the diameters of via holes can stay the same, but the distribution density of via holes increase as the distance to light source increases. Another alternative is that both diameters of via holes and the distribution density of via holes increase as the distance to light source increases. No specific restriction is imposed by the present embodiment.

According to the present embodiment, light sources 506 are LED light bars or other lighting devices.

In summary, the present invention includes a plurality of via holes disposed at correspond areas on the optical film between two neighboring light sources. Through via holes on optical film the amount of light passing through the corresponding areas on the optical film between two neighboring light sources increases so that the luminance at those areas approximates or the same as the luminance to the areas corresponding to above of light sources. In this manner, the present invention can realize both the luminance uniformity of backlight module and thin design of liquid crystal display device.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A direct-light backlight module, comprising:
   at least two light sources;
   a diffuser plate, disposed above said light sources;
   a reflection plate, disposed beneath said light sources; and
   an optical film, disposed on top of said diffuser plate, further comprising two first areas without via holes disposed therein, a second area between and immediately connected with said two first areas and a plurality of via holes; said two first areas each disposed directly above a corresponding one of two neighboring said light sources, said second area disposed between said two neighboring light sources, and said plurality of via holes disposed in said second area of said optical film; said plurality of via holes being uniformly distributed and diameter of via hole increasing as distance to said light sources increases; or, diameters of via holes staying the same, but distribution density of via holes increasing as distance to said light sources increases; or, both diameters of via holes and distribution density of via holes increasing as distance to said light sources increases;
   wherein said optical film further comprising a diffuser film and two prism lenses, said diffuser film being disposed between two said prism lenses and said diffuser plate, or two said prism lenses being disposed between said diffuser film and said diffuser plate; and cross-sections of surfaces of said two prism lenses consists of a plurality of connected zigzag shapes or a plurality of connected semicircles.

2. The direct-light backlight module as claimed in claim 1, wherein said plurality of via holes are disposed on said diffuser film.

3. The direct-light backlight module as claimed in claim 1, wherein said prism lenses are made of PET material, and said diffuser film is made of PET or PC material.

4. The direct-light backlight module as claimed in claim 1, wherein said light sources are LED light bars.

5. A direct-light backlight module, comprising:
   at least two light sources;
   a diffuser plate, disposed above said light sources;
   a reflection plate, disposed beneath said light sources; and
   an optical film, disposed on top of said diffuser plate, further comprising two first areas without via holes disposed therein, a second area between and immediately connected with said two first areas and a plurality of via holes; said two first areas each disposed directly above a corresponding one of two neighboring said light sources, said second area disposed between said two neighboring light sources, and said plurality of via holes disposed in said second area of said optical film;
   wherein said optical film further comprises a diffuser film and two prism lenses, said diffuser film is disposed between two said prism lenses and said diffuser plate, or two said prism lenses is disposed between said diffuser film and said diffuser plate; and cross-sections of surfaces of said prism lenses consists of a plurality of connected zigzag shapes or a plurality of connected semicircles.

6. The direct-light backlight module as claimed in claim 5, wherein said plurality of via holes is uniformly distributed and diameter of via hole increases as distance to said light sources increases.

7. The direct-light backlight module as claimed in claim 5, wherein diameters of via holes stay the same, but distribution density of via holes increases as distance to said light sources increases.

8. The direct-light backlight module as claimed in claim 5, wherein said plurality of via holes are disposed on said diffuser film.

9. The direct-light backlight module as claimed in claim 5, wherein said prism lenses are made of PET material, and said diffuser film is made of PET or PC material.

10. The direct-light backlight module as claimed in claim 5, wherein said light sources are LED light bars.

11. A liquid crystal display device, comprising:
    at least two light sources;
    a diffuser plate, disposed above said light sources;
    a reflection plate, disposed beneath said light sources;
    an optical film, disposed on top of said diffuser plate, further comprising two first areas without via holes disposed therein a second area between and immediately connected with said two first areas and a plurality of via holes; said two first areas each disposed directly above a corresponding one of two neighboring said light sources, said second area disposed between said two neighboring light sources, and said plurality of via holes disposed in said second area of said optical film; and a liquid crystal panel, disposed on top of said optical film;

wherein said optical film further comprises a diffuser film and two prism lenses, said diffuser film is disposed between two said prism lenses and said diffuser plate, or two said prism lenses is disposed between said diffuser film and said diffuser plate; and cross-sections of surfaces of said prism lenses consists of a plurality of connected zigzag shapes or a plurality of connected semicircles.

12. The liquid crystal display device as claimed in claim 11, wherein said plurality of via holes is uniformly distributed and diameter of via hole increases as distance to said light sources increases; or, diameters of via holes stay the same, but distribution density of via holes increases as distance to said light sources increases.

13. The liquid crystal display device as claimed in claim 11, wherein said plurality of via holes are disposed on said diffuser film.

14. The liquid crystal display device as claimed in claim 11, wherein said prism lenses are made of PET material, and said diffuser film is made of PET or PC material.

15. The liquid crystal display device as claimed in claim 11, wherein said light sources are LED light bars.

16. The direct-light backlight module as claimed in claim 1, wherein said plurality of via holes are disposed on and penetrating through two said prism lenses, or on and penetrating through both two said prism lenses and said diffuser film.

17. The direct-light backlight module as claimed in claim 5, wherein said plurality of via holes are disposed on and penetrating through two said prism lenses, or on and penetrating through both two said prism lenses and said diffuser film.

18. The liquid crystal display device as claimed in claim 11, wherein said plurality of via holes are disposed on and penetrating through two said prism lenses, or on and penetrating through both two said prism lenses and said diffuser film.

* * * * *